(12) United States Patent
Umehara (10) Patent No.: US 12,150,100 B2
(45) Date of Patent: Nov. 19, 2024

(54) COMMUNICATION DEVICE, CONTROL METHOD, AND STORAGE MEDIUM

(71) Applicant: CANON KABUSHIKI KAISHA, Tokyo (JP)

(72) Inventor: Makoto Umehara, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 362 days.

(21) Appl. No.: 17/748,211

(22) Filed: May 19, 2022

(65) Prior Publication Data
US 2022/0394693 A1 Dec. 8, 2022

(30) Foreign Application Priority Data
Jun. 2, 2021 (JP) ................................. 2021-093146

(51) Int. Cl.
*H04W 4/00* (2018.01)
*H04L 5/00* (2006.01)
*H04W 72/044* (2023.01)

(52) U.S. Cl.
CPC ......... *H04W 72/044* (2013.01); *H04L 5/0007* (2013.01)

(58) Field of Classification Search
CPC .... H04W 72/044; H04W 72/04; H04L 5/007; H04L 5/00; H04L 27/0012; H04L 27/26
USPC ....................................................... 370/330
See application file for complete search history.

(56) References Cited

U.S. PATENT DOCUMENTS

| | | | |
|---|---|---|---|
| 8,837,516 B2 | 9/2014 | Umehara et al. | |
| 2012/0322454 A1* | 12/2012 | Sundaresan | H04L 41/5009 455/450 |
| 2014/0274079 A1* | 9/2014 | Li | H04L 5/0048 455/450 |
| 2021/0075580 A1* | 3/2021 | Thubert | H04W 72/0453 |
| 2021/0298064 A1* | 9/2021 | Luo | H04L 5/0051 |
| 2021/0385118 A1 | 12/2021 | Umehara | |
| 2022/0109548 A1* | 4/2022 | Thubert | H04W 16/10 |
| 2023/0063592 A1* | 3/2023 | Tsujimaru | H04W 72/0453 |

(Continued)

FOREIGN PATENT DOCUMENTS

WO 2017/073006 A1 5/2017

*Primary Examiner* — Marceau Milord
(74) *Attorney, Agent, or Firm* — Carter, DeLuca & Farrell LLP (57) ABSTRACT

A communication device that supports first and second communication standards using an OFDMA (Orthogonal Frequency Division Multiple Access) technique allocates, based on a frequency resource that has been allocated for a first other communication device in accordance with the first communication standard that uses a first pattern for allocating a frequency resource, a frequency resource for a second other communication device that conforms to the second communication standard that uses a second pattern for allocating a frequency resource. The communication device specifies, from among frequency resources in the second pattern, a second frequency resource that partially or entirely overlaps with a first frequency resource that has been allocated to the first other communication device, and allocates a frequency resource that are not included in the second frequency resource in the second pattern to the second other communication device.

12 Claims, 6 Drawing Sheets

(56) References Cited

U.S. PATENT DOCUMENTS

| | | | |
|---|---|---|---|
| 2023/0115667 A1* | 4/2023 | Yoshikawa | H04W 76/15 370/329 |
| 2023/0179334 A1* | 6/2023 | Yoshikawa | H04L 5/0053 370/329 |

* cited by examiner

| RU NUMBER | ax RU SUBCARRIER NUMBER | be RU SUBCARRIER NUMBER | ALLOCABLE TO |
|---|---|---|---|
| 1 | [-499:-448] | [-499:-448] | ax |
| 2 | [-445:-394] | [-445:-394] | ax |
| 3 | [-365:-314] | [-365:-314] | ax |
| 4 | [-311:-260] | [-311:-260] | ax |
| 5 | [-257:-206] | [-252:-201] | be |
| 6 | [-203:-152] | [-198:-147] | be |
| 7 | [-123:-72] | [-118:-67] | be |
| 8 | [-69:-18] | [-64:-13] | be |
| 9 | [18:69] | [13:64] | be |
| 10 | [72:123] | [67:118] | be |
| 11 | [152:203] | [147:198] | be |
| 12 | [206:257] | [201:252] | be |
| 13 | [260:311] | [260:311] | ax |
| 14 | [314:365] | [314:365] | ax |
| 15 | [394:445] | [394:445] | ax |
| 16 | [448:499] | [448:499] | ax |

FIG. 8

| RU NUMBER | ax RU SUBCARRIER NUMBER | be RU SUBCARRIER NUMBER | ALLOCABLE TO |
|---|---|---|---|
| 1 | [-499:-448] | [-499:-448] | ax |
| 2 | [-445:-394] | [-445:-394] | ax |
| 3 | [-365:-314] | [-365:-314] | be |
| 4 | [-311:-260] | [-311:-260] | be |
| 5 | [-257:-206] | [-252:-201] | ax |
| 6 | [-203:-152] | [-198:-147] | ax |
| 7 | [-123:-72] | [-118:-67] | be |
| 8 | [-69:-18] | [-64:-13] | be |
| 9 | [18:69] | [13:64] | ax |
| 10 | [72:123] | [67:118] | ax |
| 11 | [152:203] | [147:198] | be |
| 12 | [206:257] | [201:252] | be |
| 13 | [260:311] | [260:311] | ax |
| 14 | [314:365] | [314:365] | ax |
| 15 | [394:445] | [394:445] | be |
| 16 | [448:499] | [448:499] | be | ained the IEEE 802.11be standard is being formulated as a new standard for the IEEE 802.11 standard series in order to further improve throughput. In the IEEE 802.11be standard, in addition to realizing efficiency in utilization of high frequencies by using OFDMA as in IEEE 802.11ax, a technique for further improving performance is being considered.

SUMMARY OF THE INVENTION

The present invention provides a resource allocation technique that enables efficient communication in an environment in which communication devices of a plurality of standards are mixed.

According to one aspect of the present invention, there is provided a communication device that supports first and second communication standards using an OFDMA (Orthogonal Frequency Division Multiple Access) technique, comprising: at least one processor that executes a set of instructions, wherein the instructions, when executed, causes the communication device to perform operations comprising: performing resource allocation processing, based on a frequency resource that has been allocated for communication of a first other communication device in accordance with the first communication standard that uses a first pattern for allocating a frequency resource, a frequency resource for communication of a second other communication device that conforms to the second communication standard that uses a second pattern for allocating a frequency resource, wherein in the resource allocation processing, in a case where the first other communication device and the second other communication device concurrently communicate, processing for specifying, from among frequency resources in the second pattern, a second frequency resource that partially or entirely overlaps with a first frequency resource that has been allocated to the first other communication device in accordance with the first pattern, and processing for allocating, from among frequency resources that are not included in the second frequency resource in the second pattern, a frequency resource to the second other communication device are performed.

COMMUNICATION DEVICE, CONTROL METHOD, AND STORAGE MEDIUM

BACKGROUND OF THE INVENTION

Field of the Invention

The present invention relates to a technique for controlling the allocation of resources in wireless communication.

Description of the Related Art

As communication standards on a wireless LAN (Wireless Local Area Network), the IEEE (Institute of Electrical and Electronics Engineers) 802.11 standards are known. The IEEE 802.11 standards are a series of standards including the IEEE 802.11a/b/g/n/ac/ax standards. International Publication No. 2017/073006 describes the IEEE 802.11ax standard in which communication is performed using OFDMA (orthogonal frequency division multiple access). The wireless communication by OFDMA can realize high peak throughput and can sufficiently ensure communication speed in congested situations (see International Publication No. 2017/073006).

Currently, the IEEE 802.11be standard is being formu-

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

It is anticipated that communication devices conforming to the IEEE 802.11ax standard and the IEEE 802.11be standard will be commonly used in the future. In such a case, a situation in which a plurality of communication devices conforming to either of these standards are mixed and perform communication in the same frequency band may occur. In the present embodiment, one of the objectives is to provide a mechanism for communication so that a new standard does not interfere with the communication of the old standards in such a situation. In addition, one of the objectives is to provide a mechanism for allocating communication resources in consideration of both the aspect of not interfering with communication of the old standards and the aspect of allowing the optimization of communication by the new standard. Specific embodiments will be described below.

(Network Configuration)

Figure 1:
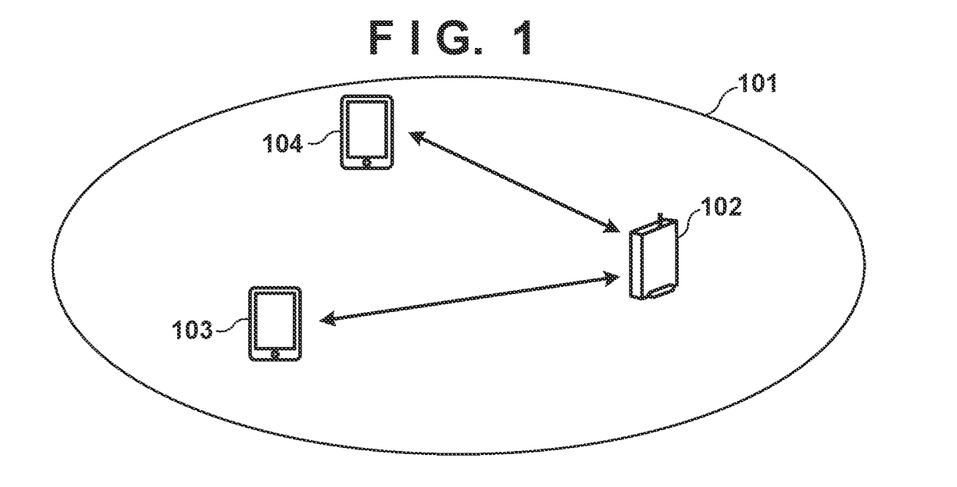
FIG. 1 is a diagram illustrating an example of a network configuration.

FIG. 1 illustrates an example of a configuration of a wireless communication network according to the present embodiment. A network 101 is a wireless communication network in which a communication device capable of executing communication conforming to the IEEE 802.11be standard and a communication device capable of executing communication conforming to the IEEE 802.11ax standard are mixed. IEEE is an abbreviation for Institute of Electrical and Electronics Engineers. IEEE 802.11be can also be called IEEE 802.11 EHT. EHT is an abbreviation for Extremely High Throughput or Extreme High Throughput. IEEE 802.11ax can also be called IEEE 802.11 HE. HE is an abbreviation for High Efficiency.

In one example, the network 101 includes an AP 102 and an STA 103 conforming to the IEEE 802.11be standard and an STA 104 capable of performing communication conforming to the IEEE 802.11ax standard. AP refers to an access point, and STA refers to a station. It is assumed that the AP 102 is capable of performing communication based on the IEEE 802.11 ax standard. That is, the AP 102 can communicate with the STA 103 in accordance with, for example, the wireless communication method of the IEEE 802.11be standard and communicate with the STA 104 in accordance with the wireless communication method of the IEEE 802.11ax standard. In the following, a device that executes communication conforming to the IEEE 802.11be standard is referred to as a be device, and a device that executes communication conforming to IEEE 802.11ax standard may be referred to as an ax device.

Each communication device can communicate in at least one frequency band of a 2.4-GHz band, a 5-GHz band, and a 6-GHz band. However, this is an example, and a different frequency band may be used, such as a 60-GHz band, for example. Also, each communication device can communicate in any signal bandwidth of 20 MHz, 40 MHz. 80 MHz, 160 MHz, and 320 MHz. A plurality of signals are multiplexed between the AP 102 and the STA 103 and the STA 104 by using OFDMA (orthogonal frequency division multiple access), and the communication of a plurality of users (STAs) is concurrently performed. The communication concurrently performed for such a plurality of users can be called multi-user (MU) communication. The AP 102 and the STA 103 may each have a plurality of antennas and may be configured to be capable of performing MIMO (Multiple-Input and Multiple-Output) communication. In such a case, a transmission-side apparatus generates a signal corresponding to each of the plurality of antennas from the plurality of data streams and transmit, from each of the plurality of antennas, a signal corresponding to each of the plurality of antennas using the same frequency channel. Then, a reception-side device concurrently receives those signals using a plurality of antennas and separates each data stream from the received signal and decodes them. By executing MIMO communication, the AP 102 and the STA 103 can transmit and receive more data in the same amount of time compared with the case where MIMO communication is not executed. The AP 102 can establish a radio link with the STA 103 or the STA 104 via connection processing such as association processing conforming to the standards of the IEEE 802.11 series.

The example of the network configuration of FIG. 1 is merely an example, and for example, a large number of be devices and ax devices may be included in a wider region. Further, other communication devices conforming to the legacy standards (IEEE 802.11a/b/g/n/ac standards) or the like prior to the IEEE 802.11ax standard may be included in the network. The AP 102, the STA 103, and the STA 104 may also support the legacy standards described above. In addition, the AP 102, the STA 103 and the STA 104 may support other communication standards such as Bluetooth®, NFC, UWB, Zigbee, and MBOA. UWB is an abbreviation for Ultra Wide Band, and MBOA is an abbreviation for Multi Band OFDM Alliance. Here, OFDM is an abbreviation for Orthogonal Frequency Division Multiplexing. In addition, NFC is an abbreviation for Near Field Communication. UWB includes wireless USB, wireless 1394, Winet, and the like. In addition, the AP 102, the STA 103 and the STA 104 may support a communication standard for wired communication such as a wired LAN.

The AP 102 may be a wireless LAN router, a personal computer (PC) or the like as one example but is not limited to these. That is, the AP 102 may be any communication device capable of performing communication with other communication devices using OFDMA in accordance with the IEEE 802.11be standard. The AP 102 may also be an information processing apparatus such as a radio chip that is capable of performing wireless communication conforming to the IEEE 802.11be standard. Also, the STA 103 may be, as one example, a camera, a tablet, a smart phone, a PC, a cell phone, a video camera, a headset, or the like but is not limited to these. That is, the STA 103 may be any communication device capable of performing communication with other communication devices using OFDMA in accordance with the IEEE 802.11be standard. The STA 103 may also be an information processing apparatus, such as a radio chip that is capable of performing wireless communication conforming to the IEEE 802.11be standard. The STA 104 may be any communication device that is capable of performing wireless communication conforming to the IEEE 802.11ax standard or an information processing apparatus, such as a radio chip. The information processing apparatus, such as a radio chip, has an antenna for transmitting a generated signal.

In the IEEE 802.11ax standard and the IEEE 802.11be standard, a frequency resource of a predetermined frequency range in which a predetermined number of OFDMA subcarriers are combined are provided as a Resource Unit (RU). An RU is a unit of frequency resources configured by a predetermined number of subcarriers, and frequency resources are allocated to an STA with an RU as the smallest unit. The IEEE 802.11ax standard and the IEEE 802.11be standard define a 26-tone RU, a 52-tone RU, a 106-tone RU, and the like in which 26 subcarriers, 52 subcarriers, 106 subcarriers, and the like, respectively, are combined as one RU. Further, in the IEEE 802.11ax standard and the IEEE 802.11be standard, a frequency bandwidth that can be used for communication is variably configured to be 20 MHz, 40 MHz, 80 MHz, 160 MHz, or the like. Within a frequency band that is used, an RU is associated with a serial number, and by specifying any of the serial numbers, an RU corresponding to that number is specified, and in accordance with that, a corresponding subcarrier number is specified. Table 1 illustrates an example of a relationship between RUs and subcarrier numbers when a 52-tone RU is used in an 80-MHz-frequency bandwidth, as defined in the IEEE 802.11ax standard. In addition, Table 2 illustrates an example of a relationship between RUs and subcarrier numbers when a 52-tone RU is used in an 80-MHz-frequency bandwidth, as defined in the IEEE 802.11be standard. In these tables, [x:y] indicates a group of subcarriers between a subcarrier number x and a subcarrier number y.

TABLE 1

| RU type | RU index and subcarrier range | | | |
|---|---|---|---|---|
| 52-tone RU | ax RU1 | ax RU2 | ax RU3 | ax RU4 |
| | [−499:−448] | [−445:−394] | [−365:−314] | [−311:−260] |
| | ax RU5 | ax RU6 | ax RU7 | ax RU8 |
| | [−257:−206] | [−203:−152] | [−123:−72] | [−69:−18] |
| | ax RU9 | ax RU10 | ax RU11 | ax RU12 |
| | [18:69] | [72:123] | [152:203] | [206:257] |
| | ax RU13 | ax RU14 | ax RU15 | ax RU16 |
| | [260:311] | [314:365] | [394:445] | [448:499] |

TABLE 2

| RU type | RU index and subcarrier range | | | |
|---|---|---|---|---|
| 52-tone RU | be RU1 [−499:−448] | be RU2 [−445:−394] | be RU3 [−365:−314] | be RU4 [−311:−260] |
| | be RU5 [−252:−201] | be RU6 [−198:−147] | be RU7 [−118:−67] | be RU8 [−64:−13] |
| | be RU9 [13:64] | be RU10 [67:118] | be RU11 [147:198] | be RU12 [201:252] |
| | be RU13 [260:311] | be RU14 [314:365] | be RU15 [394:445] | be RU16 [448:499] |

When an STA that operates in conformance with the IEEE 802.11ax standard or the IEEE 802.11be standard transmits a signal to an AP, the STA can transmit the signal to the AP in an RU that has been allocated to itself. The AP transmits a trigger frame, which will be described later, to a plurality of STAs, and the STAs transmit a signal in an allocated RU in response to receiving the trigger frame. In the IEEE 802.11ax standard and the IEEE 802.11be standard, UL-MU (UpLink Multi-User) transmission by OFDMA is performed by a plurality of STAs transmitting a signal in a different RU in accordance with a trigger frame. UpLink refers to a link in a direction in which a signal is transmitted from an STA to an AP.

In the following, description will be given assuming that a 52-tone RU is used in an 80-MHz bandwidth. That is, the AP 102 allocates the 52-tone RU defined such as in Table 1 and Table 2 above to each of the STA 103 supporting IEEE 802.11be and the STA 104 supporting IEEE 802.11ax. However, this is one example, and the following discussion may also apply for when an RU of another size (such as 26-tone or 106-tone) is used or for when a frequency band of another frequency bandwidth (a 20-MHz width, a 40-MHz width, a 160-MHz width) is used. In the following, an RU defined in the IEEE 802.11ax standard is referred to as an ax RU, and an RU defined in the IEEE 802.11be standard is referred to as a be RU. In addition, an STA that operates in conformance with IEEE 802.11ax is called an ax STA, and an STA that operates in conformance with IEEE 802.11be is called a be STA.

Here, a case where the AP 102 allocates a be RU 12 to the STA 103 and an ax RU 11 to the STA 104 will be considered. In such a case, since the STA 103 operates based on the IEEE 802.11be standard, it performs a UL-MU transmission using subcarriers having subcarrier numbers 201 to 252. Meanwhile, since the STA 104 operates based on the IEEE 802.11 ax standard, it performs a UL-MU transmission using subcarriers having subcarrier numbers 152 to 203. As a result, both the STA 103 and the STA 104 transmit a signal on the subcarriers having subcarrier numbers 201 to 203. Therefore, in these subcarriers, a signal transmitted from the STA 103 and a signal transmitted from the STA 104 interfere with each other. That is, due to a difference between a first RU pattern provided in the IEEE 802.11ax standard and a second RU pattern provided in the IEEE 802.11be standard, interference may occur depending on the allocation of RUs. As a result, the AP 102 fails to receive these signals, and due to retransmission or the like being performed, for example, the frequency utilization efficiency of the entire system may decrease.

In the present embodiment, the AP 102 provides a technique for allocating RUs to the ax STA and the be STA to prevent such an interference from occurring. In the following, an apparatus configuration of the AP 102 will be described, and then examples of a flow of processing performed by the AP 102 will be described.

(Apparatus Configuration)

Figure 2:
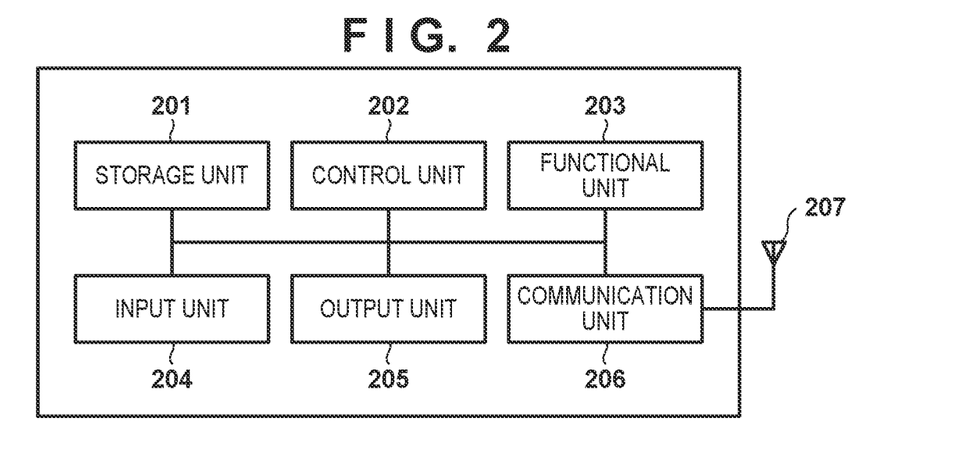
FIG. 2 is a diagram illustrating an example of a hardware configuration of an AP.

FIG. 2 is a diagram illustrating an example of a hardware configuration of the AP 102 according to the present embodiment. The AP 102 includes, for example, a storage unit 201, a control unit 202, a functional unit 203, an input unit 204, an output unit 205, a communication unit 206, and an antenna 207. Although the STA 103 and the STA 104 may also have the same configuration, description will be given here focusing on the AP 102.

The storage unit 201 is configured including one or more memories, such as a ROM and a RAM, for example, and stores various kinds of information such as a computer program for performing various operations to be described later and communication parameters for wireless communication. ROM is an abbreviation of Read Only Memory, and RAM is an abbreviation of Random Access Memory. In addition to or in place of a memory, such as a ROM or a RAM, the storage unit 201 may include a storage medium such as a flexible disk, a hard disk, an optical disk, a magnetic optical disk, a CD-ROM, CD-R, a magnetic tape, a non-volatile memory card, or a DVD. The storage unit 201 may also include a plurality of memories or the like.

The control unit 202 is configured by one or more processors, such as a CPU and an MPU, for example, and controls the entire AP 102 by executing a computer program stored in the storage unit 201, for example. CPU is an abbreviation of Central Processing Unit, and MPU is an abbreviation of Micro Processing Unit. In addition to controlling the entire AP 102, the control unit 202 may be configured to perform processing for generating data or a signal (a radio frame) to be transmitted when communicating with another communication device (e.g., the STA 103). The control unit 202 may be configured to execute processing such as control of the entire AP 102 by, for example, a computer program stored in the storage unit 201 and an OS (Operating System) cooperating. Further, the control unit 202 includes a plurality of processors, such as a multi-core, and may execute processing such as overall control of the AP 102 by the plurality of processors. Further, the control unit 202 may be configured by an ASIC (Application Specific Integrated Circuit), a DSP (Digital Signal Processor), an FPGA (Field Programmable Gate Array), or the like.

Further, the control unit 202 executes predetermined processing, such as image capturing, printing, or projection by controlling the functional unit 203. The functional unit 203 is hardware for the AP 102 to perform predetermined processing. For example, if the AP 102 is a camera, the functional unit 203 is an image capturing unit and performs image capturing processing. In addition, for example, if the AP 102 is a printer, the functional unit 203 is a printing unit and performs printing processing. In addition, for example, if the AP 102 is a projector, the functional unit 203 is a projection unit and performs projection processing. The data to be processed by the functional unit 203 may be data stored in the storage unit 201 or data communicated with another communication device (e.g., the STA 103) via the communication unit 206, which will be described later).

The input unit 204 accepts various operations from the user. The output unit 205 performs various outputs to the user. Here, output by the output unit 205 includes, for example, at least one of a display on a screen, audio output by a speaker, vibration output, and the like. Both the input unit 204 and the output unit 205 may be realized by one module such as in the case of a touch panel. The input unit 204 and the output unit 205 may each be built in the AP 102 or may be configured as an external device to be connected to a communication device.

The communication unit 206 controls wireless communication conforming to the IEEE 802.11 standard series and controls IP communication. In the present embodiment, the communication unit 206 is particularly configured to control wireless communication conforming to the IEEE 802.11be standard and control, as necessary, wireless communication conforming to the IEEE 802.11ax standard. Further, the communication unit 206 may be configured to control wireless communication conforming to the legacy standards described above in the IEEE 802.11 standards. Further, the communication unit 206 may be configured to control wired communication such as a wired LAN. The communication unit 206 transmits and receives a signal for wireless communication generated by the control unit 202, for example, by controlling the antenna 207. The AP 102 may be configured to include a plurality of communication units 206. In such a case, the AP 102 can perform a multi-link communication by establishing a plurality of links, each of which is established using one communication unit 206. The AP 102 may establish a plurality of links using one communication unit 206. In such a case, the communication unit 206 can perform communication via a plurality of links by, for example, switching the operating frequency channel in a time division manner. When the AP 102 corresponds to the NFC standard, the Bluetooth standard, or the like, the communication unit 206 may also control wireless communication conforming to these communication standards. When the AP 102 is configured so as to be capable of executing wireless communication conforming to a plurality of communication standards, the communication unit 206 and the antenna 207 corresponding to each communication standard may be individually provided. Further, the AP 102 communicates data, such as image data, document data, and video data, with a communication partner device (e.g., the STA 103 or the STA 104) via the communication unit 206. The antenna 207 may be provided separately from the communication unit 206 or may be configured as one module combined with the communication unit 206.

The antenna 207 is an antenna that enables communication in a sub-GHz band, a 2.4-GHz band, a 5-GHz band, and a 6-GHz band. The AP 102 may have a multiband antenna as the antenna 207 or may have, for each frequency band, a plurality of antennas corresponding to the respective frequency bands. Further, when having a plurality of antennas 207, the AP 102 may have a plurality of communication units 206 corresponding to each of the plurality of antennas or may have a smaller number of communication units 206 than the number of antennas such as one communication unit 206 for a plurality of antennas. The antenna 207 may be a single antenna or an antenna array. That is, the antenna 207 may have a plurality of antenna elements and may be configured to be capable of performing multi-antenna communication such as MIMO, for example.

Figure 3:
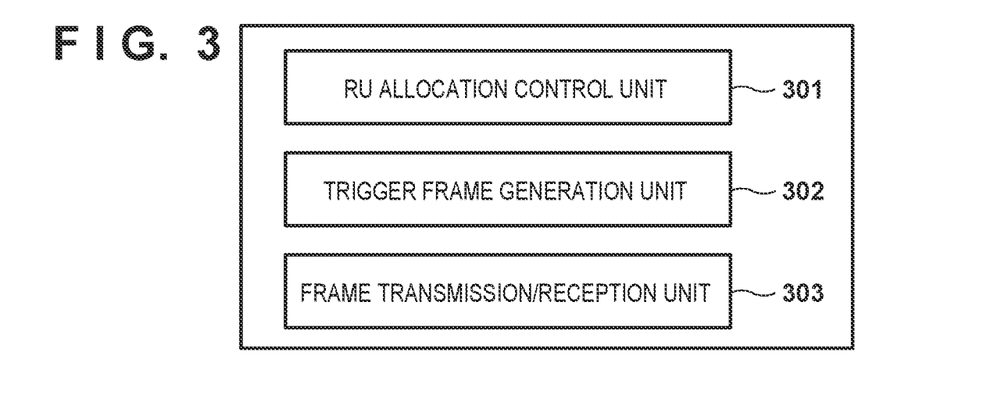
FIG. 3 is a diagram illustrating an example of a functional configuration of the AP.

FIG. 3 illustrates an example of a functional configuration of the AP 102. The AP 102 includes, for example, an RU allocation control unit 301, a trigger frame generation unit 302, and a frame transmission/reception unit 303 as its functional configuration.

The RU allocation control unit 301 allocates an RU to the STA 103 and the STA 104 with which a radio link has been established. The trigger frame generation unit 302 generates a trigger frame that gives an opportunity for an STA to transmit a signal based on the allocation of an RU determined by the RU allocation control unit 301. The frame transmission/reception unit 303 controls the transmission and reception of a management frame which includes the trigger frame, a control frame, and a data frame. A trigger frame generated by the trigger frame generation unit 302 is transmitted to the STA 103 and the STA 104 by the frame transmission/reception unit 303. Based on the content of the trigger frame, the STA 103 and the STA 104 transmit a signal in an RU that has been allocated to themselves. This allows the STA 103 and the STA 104 to transmit a signal to the AP 102 in an UL-MU transmission by OFDMA.

Figure 4:
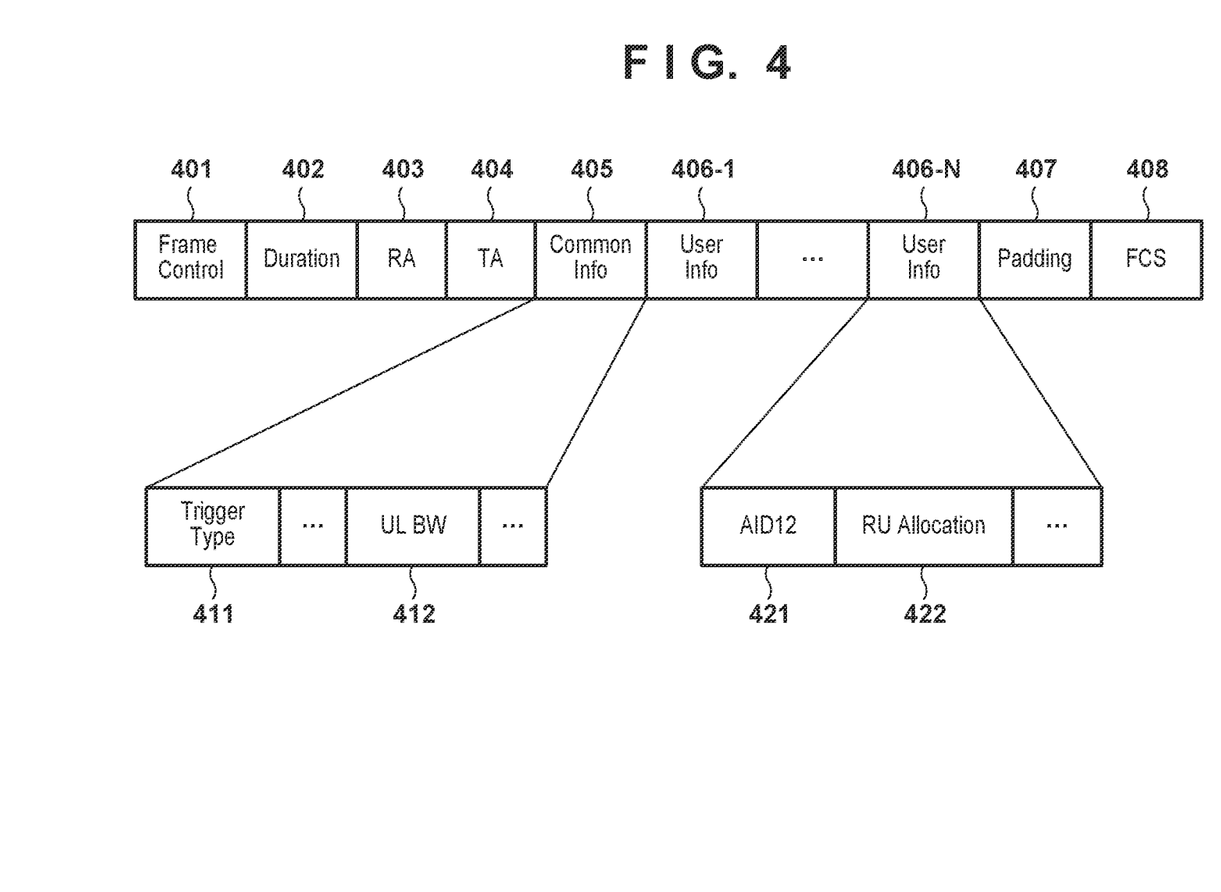
FIG. 4 is a diagram illustrating a configuration of a trigger frame.

Here, a format of a trigger frame will be described with reference to FIG. 4. The fields/subfields illustrated here conform to the format specified in IEEE 802.11ax. That is, the trigger frame contains the respective fields of Frame Control 401, Duration 402, RA 403, TA 404, Common Info 405, User Info 406, Padding 407, and FCS 408. Among these fields, the Common Info field 405 includes information shared by a plurality of STAs for which communication is multiplexed by OFDMA. In addition, the User Info field 406 contains unique information for each of the plurality of STAs. The number of User Info fields 406 to be provided corresponds to the number of STAs. In one example, a frequency bandwidth to be used is notified to all of the target STAs by a UL BW subfield 412 in the Common Info field 405. Meanwhile, allocation information, which indicates the allocation of an RU to be used by each STA, is notified individually to each STA by an AID12 subfield 421 and an RU Allocation subfield 422 in the User Info field 406. The AID12 subfield 421 stores an AID (Association ID), which is identification information capable of uniquely specifying an STA, which has been allocated to the STA at the time of association. Thus, it becomes possible for an STA that has received this frame to specify which User Info field 406 information for itself is stored in. Then, the STA specifies the RU that has been allocated to itself by confirming the RU Allocation subfield 422 in the User Info field 406 in which its AID is stored in the AID12 subfield 421. A serial number is associated with each RU, and among those serial numbers, a number corresponding to an RU to be allocated to the STA is stored in the RU Allocation subfield 422.

(Processing Flow)

Next, examples of a flow of processing for allocating an RU to be executed by the AP 102 will be described. The processing to be described below is realized by the control unit 202 reading and executing a computer program stored in the storage unit 201 when the AP 102 determines the allocation of an RU. Dedicated hardware for executing the following process may be used, or an implementation such that a processor included in the communication unit 206, for example, executes the following process may be used.

Processing Example 1

Figure 5:
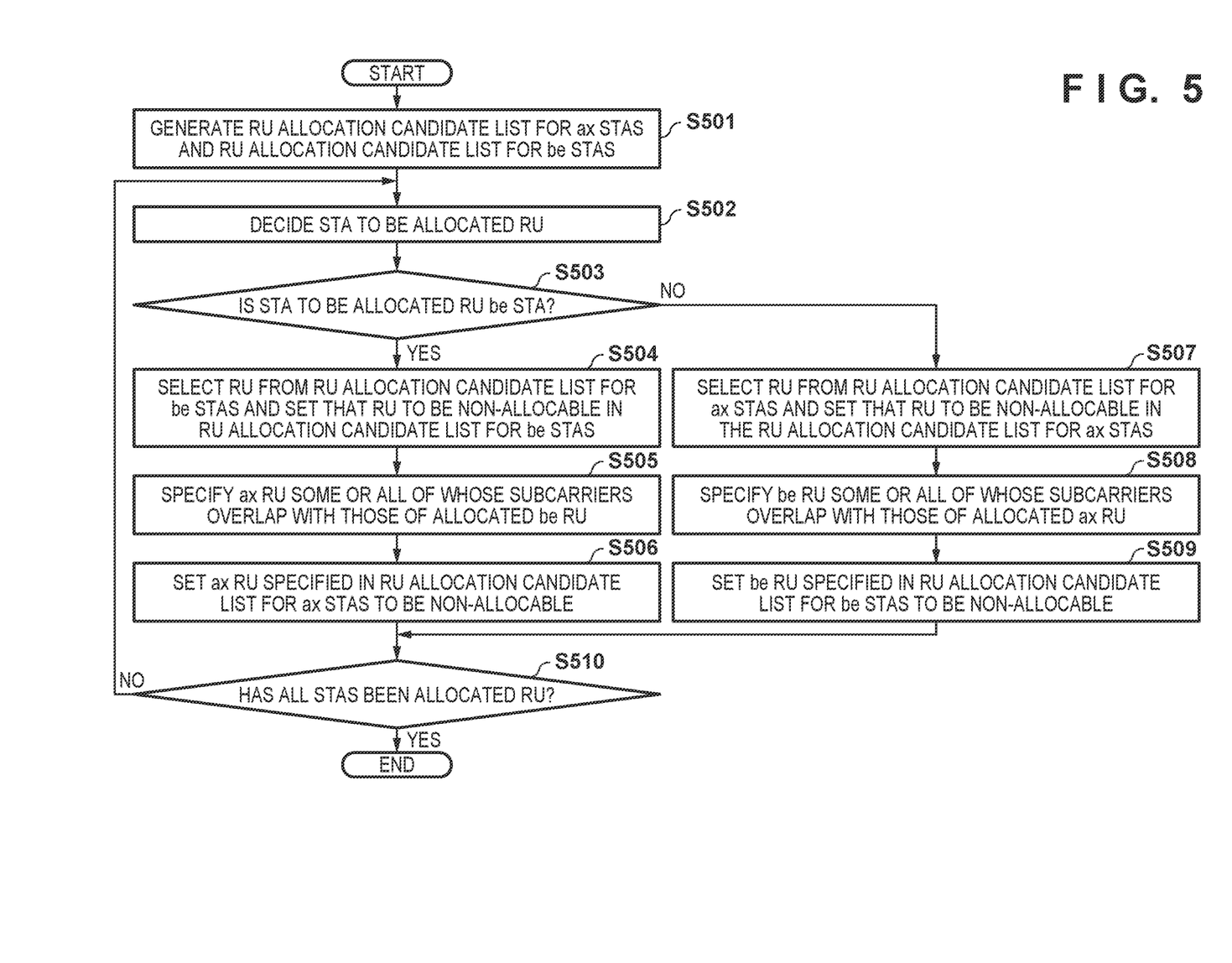
FIG. 5 is a diagram for explaining a first example of a flow of processing executed by the AP.

FIG. 5 illustrates an example of the flow of processing executed by the RU allocation control unit 301 of the AP 102 in the present example of the processing. In the present processing, the AP 102 first generates an RU allocation candidate list for ax STAs representing RU candidates that are allocable to ax STAs and an RU allocation candidate list for be STAs representing RU candidates that are allocable to be STAs (step S501). Initially, all ax RUs and all be RUs are handled as RU candidates that are allocable. This is because any RU can be allocated to an STA when no RU is allocated to any STA. In one example, an RU allocation candidate list is configured to include an RU number and a subcarrier number configuring an RU corresponding to that RU number as illustrated in Table 1 or Table 2. However, the present invention is not limited to this, and configuration may be such that an RU number is included but a subcarrier number configuring an RU corresponding to that RU number is not included or an RU number is not included but a subcarrier number configuring an RU corresponding to each RU number is included.

Next, the AP 102 determines to which STA an RU is to be allocated among STAs that have established a radio link with the AP 102 (step S502). Here, the allocation order of RUs in STAs that have established a radio link can be determined by any method. For example, the allocation order of RUs can be determined by a method in which the RUs are allocated preferentially from an STA having a smaller AID or a method in which the RUs are allocated preferentially from an STA having a larger AID. Further, the allocation order of RUs may be determined by a method in which the RUs are allocated preferentially from an STA having a smaller or larger MAC (media access control) address value. Further, the RUs may be allocated with priority to ax STAs, or the RUs may be allocated with priority to be STAs. For example, in an environment in which an ax STA and a be STA are mixed, configuration may be taken so as to finish the allocation of an RU to either and then execute the allocation of an RU to the other. These are only examples, and the allocation order of RUs may be determined by another criterion such as allocating RUs preferentially from an STA having a large amount of buffered data to be transmitted, for example. Further, a different priority may be assigned to each of an ax STA and a be STA and a priority may be made to increase as the amount of buffered data to be transmitted increases, and an STA to which an RU is preferentially allocated may be determined based on the combination of these priorities.

The AP 102 determines whether an STA to be allocated an RU is a be STA (step S503). If the STA to be allocated an RU is a be STA (YES in step S503), the AP 102 selects an RU to be allocated to the STA from the RU allocation candidate list for be STAs (step S504). Then, in accordance with the allocation of the selected RU to the STA to be allocated an RU, the AP 102 sets that RU to be non-allocable in the RU allocation candidate list for be STAs so as not to allocate that RU in the subsequent allocation processing (step S504). The setting of an RU to be non-allocable may be performed by, for example, providing a flag, which indicates whether or not it is to be allocated, for each RU of the RU allocation candidate list for be STAs and setting the flag for the RU allocated in step S504 to a value indicating that it is non-allocable. In addition, RUs that have been made non-allocable may be deleted from the RU allocation candidate list for be STAs.

In an initial state, all RUs are allocable in the RU allocation candidate list for be STAs, so the AP 102 allocates any RU to a be STA. If RUs have been allocated to one or more STAs, the AP 102 allocates one of the remaining RUs, avoiding the RUs that have been made non-allocable. Here, when there are a plurality of allocable RUs, the AP 102 may randomly select an RU from the plurality of RUs, for example. However, the present invention is not limited to this, and the allocation of RUs may be performed by any method. For example, the AP 102 may select the RU having the smallest RU number or the RU having the largest RU number from among the allocable RUs. The AP 102 may also obtain a CSI (Channel State Information) from the STA to be allocated an RU and select an RU based on this CSI. For example, the AP 102 may allocate an RU whose radio quality is good for the STA to be allocated an RU from among the allocable RUs. In addition, when performing a UL-MU communication with the STA to be allocated an RU, the AP 102 may select an RU to be allocated to the STA based on the radio quality of a signal received from the STA at that time. The radio quality may be, for example, SNR (signal-to-noise ratio) or SINR (signal-to-interference-plus-noise ratio).

When the AP 102 has selected a be RU to be allocated to a be STA, it specifies an ax RU some or all of whose subcarriers overlaps with that RU (step S505). Then, the AP 102 sets the ax RU specified in step S505 to be non-allocable in the RU allocation candidate list for ax STAs (step S506). For example, it is assumed that, in step S504, the AP 102 selects the be RU 12 (subcarrier numbers 201 to 252) as the RU to be allocated to the STA 103. In this instance, in step S505, the AP 102 specifies the ax RU 11 corresponding to the subcarriers of subcarrier numbers 152 to 203 and an ax RU 12 corresponding to the subcarriers of subcarrier numbers 206 to 257. This is because the ax RU 11 includes subcarriers with subcarrier numbers 201 to 203 and the ax RU 12 includes subcarriers with subcarrier numbers 206 to 252. Then, in step S506, the AP 102 sets the ax RU 11 and the ax RU 12 in the RU allocation candidate list for ax STAs to be non-allocable. This makes it possible to make non-allocable an ax RU, among the ax RUs, that is expected to mutually interfere with a signal transmitted on the be RU allocated in step S504 when a signal is transmitted on that RU. The setting of an RU to be non-allocable may be performed by, for example, providing a flag, which indicates whether or not it is to be allocated, for each RU of the RU allocation candidate list for ax STAs and setting the flag for the RU specified in step S505 to a value indicating that it is non-allocable. In addition, RUs that have been made non-allocable may be deleted from the RU allocation candidate list for ax STAs. As a result, the AP 102 can specify, as an RU that is allocable to the ax STA, an ax RU that differs from an ax RU some or all of whose subcarriers overlap with the RU that has been allocated to a be STA.

Meanwhile, when the STA to be allocated an RU is an ax STA (NO in step S503), the AP 102 performs the processing in steps S504 to S506 by switching the be RU and the ax RU. That is, the AP 102 selects an RU to be allocated to the STA from the RU allocation candidate list for ax STAs and sets the selected RU to be non-allocable in the RU allocation candidate list for ax STAs (step S507). Then, the AP 102 specifies a be RU some or all of whose subcarriers overlap with those of the ax RU that has been selected to be allocated to the ax STA (step S508). Then, the AP 102 sets the be RU specified in step S508 to be non-allocable in the RU allocation candidate list for be STAs (step S509). As a result, the AP 102 can specify, as an RU that is allocable to the be STA, a be RU that differs from a be RU some or all of whose subcarriers overlap with the RU that has been allocated to an ax STA.

Then, the AP 102 determines whether or not all the STAs for which a radio link has been established with the AP 102 have been allocated an RU (step S510). Then, if all the STAs for which a radio link has already been established have been allocated an RU, the AP 102 ends the process (YES in step S510). Meanwhile, if there is an STA for an RU has not been allocated among the STAs for which a radio link has already been established (NO in step S510), the AP 102 returns the processing to step S502 and continues the allocation of RUs. Instead of or in addition to the determination in step S510 as to whether all of the STAs for which a radio link has already been established have been allocated an RU, the AP 102 may determine whether or not allocable RUs remain. That is, if there are no remaining allocable RUs, the processing may be ended.

Processing Example 2

According to the relationship between RUs and subcarriers as illustrated in Tables 1 and 2, there are cases where all the corresponding subcarriers coincide between a be RU and an ax RU and cases where some of the subcarriers do not coincide. For example, all corresponding subcarriers coincide between an RU 1 to an RU 4 and an RU 13 to an RU 16 in the IEEE 802.11be standard and the IEEE 802.11 ax standard. Thus, communication in these RUs may affect only one corresponding RU. Meanwhile, for an RU 5 to an RU 12, some of the corresponding subcarriers do not coincide, and so communication on one ax RU may affect two be RUs, and communication on one be RU may affect two ax RUs. In the present example of the processing, each group of RUs whose corresponding subcarriers do not coincide is set to be exclusively allocated to be STAs or exclusively allocated to ax STAs. As a result, RUs are efficiently allocated while preventing the communication of an ax STA and the communication of a be STA from interfering with each other.

Figure 6:
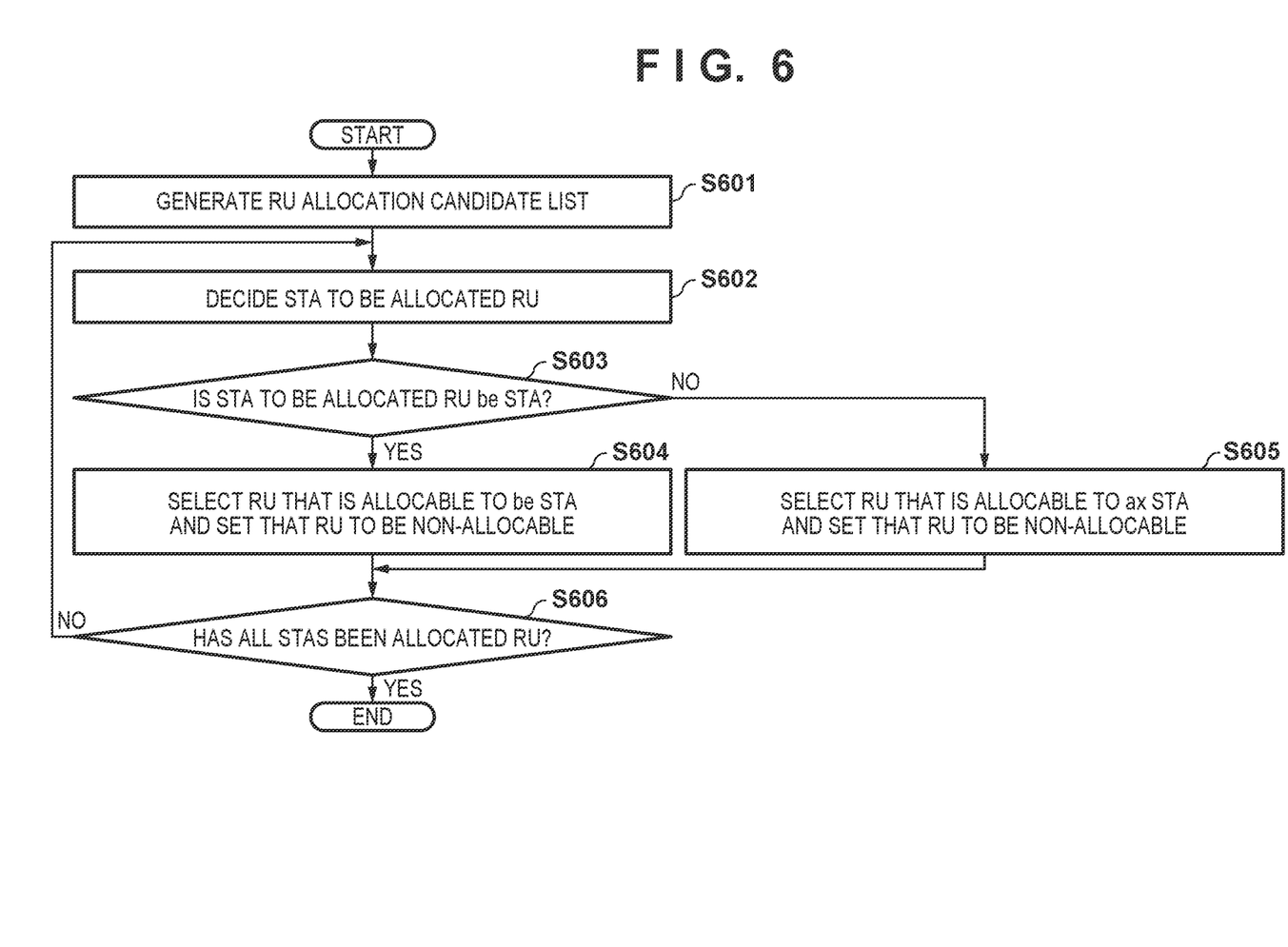
FIG. 6 is a diagram for explaining a second example of the flow of processing executed by the AP.
Figure 7:
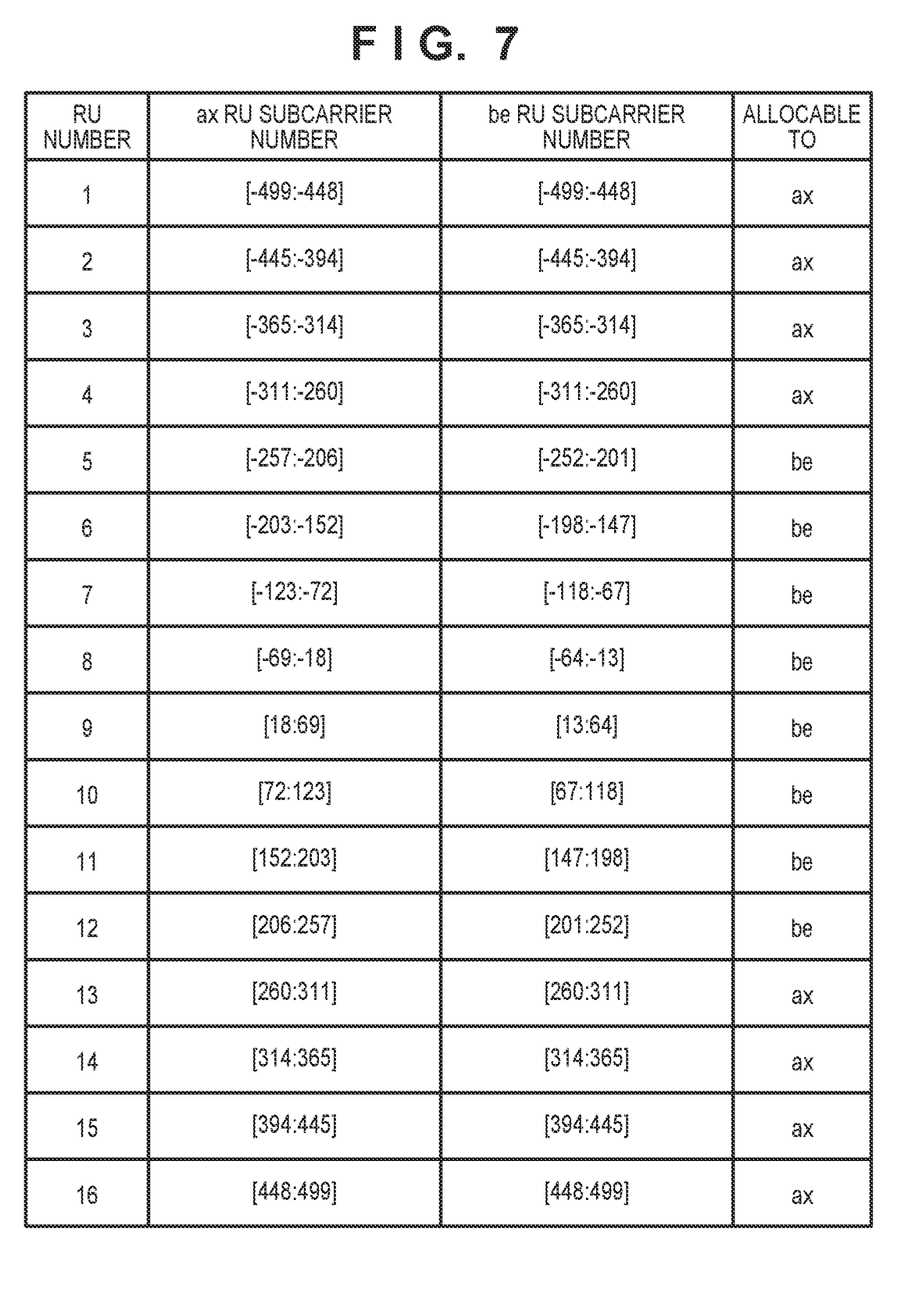
FIG. 7 is a diagram illustrating a first example of an RU allocation list.
Figure 8:
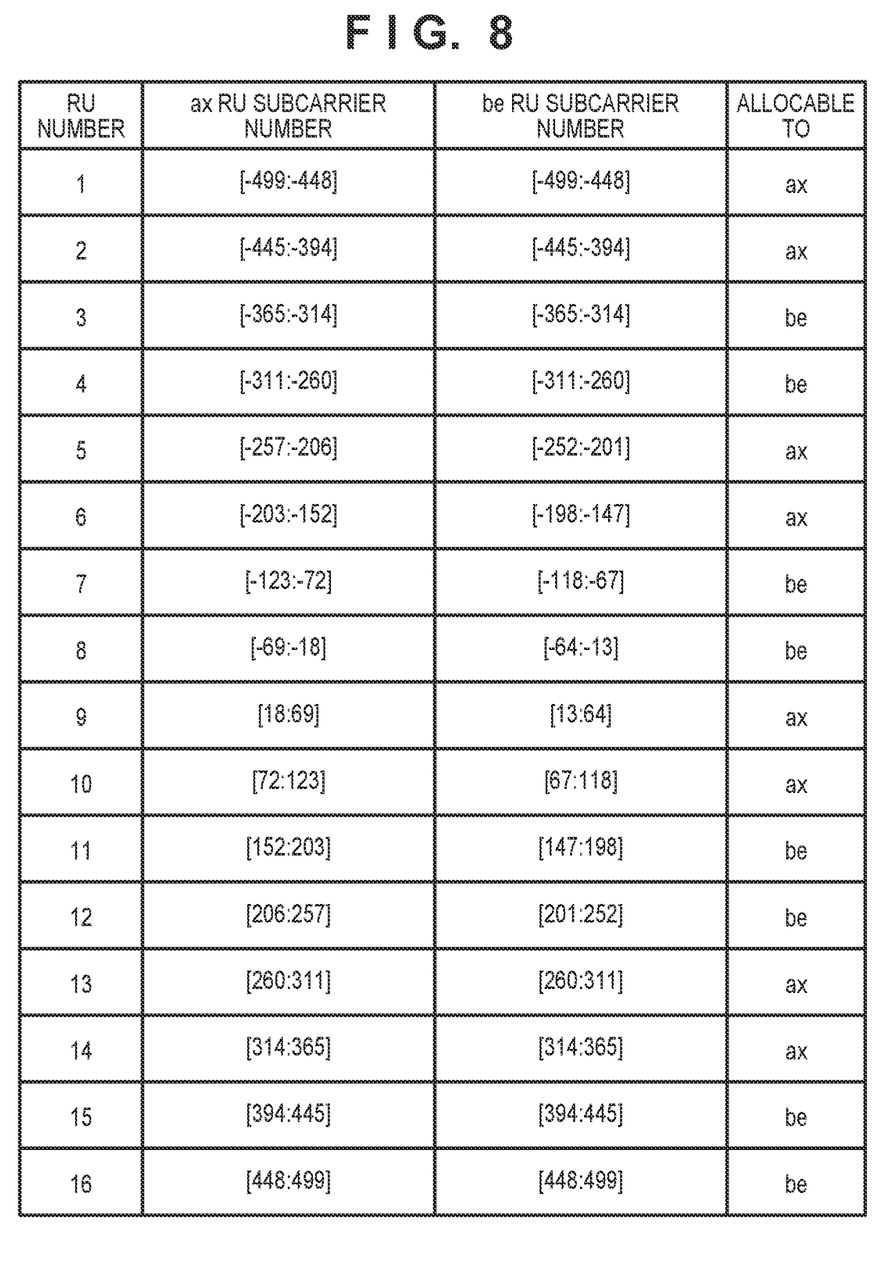
FIG. 8 is a diagram illustrating a second example of the RU allocation list.

FIG. 6 illustrates an example of the flow of processing executed by the RU allocation control unit 301 of the AP 102 in the present example of the processing. The AP 102 first generates an RU allocation list that indicates whether an RU is allocable to an ax STA or a be STA for each RU (step S601). FIG. 7 illustrates an example of an RU allocation list. The RU allocation list is configured to include an RU number and information indicating whether each RU is allocable to ax STAs or be STAs. FIG. 7 illustrates an example in which the RU 1 to the RU 4 and the RU 13 to the RU 16 are set as RUs that are allocable to ax STAs and the RU 5 to the RU 12 are set as RUs that are allocable to be STAs. The setting content of the RU allocation list is determined so as not to cause interference. For example, when the RU 5 is an RU that is allocable to a be STA, since some subcarriers of a be RU 5 overlap with that of an ax RU 5 and an ax RU 6, an RU 6 is set so as not to be allocated to an ax STA. Therefore, when the RU 5 is set as an RU that is allocable to a be STA, the RU 6 is also set as an RU that is allocable to a be STA. Similarly, when the RU 7 is set as an RU that is allocable to a be STA, the RU 8 is also set as an RU that is allocable to a be STA. The RU allocation list of FIG. 7 is configured in this way. FIG. 7 is an example, and another RU allocation list can be generated by the same method. For example, in FIG. 7, all of the RUs allocable to be STAs and the RUs allocable to ax STAs may be switched. Also, an RU allocation list as illustrated in FIG. 8 may be generated. In addition the examples of FIGS. 7 and 8 indicate cases where the number of RUs allocable to ax STAs matches the number of RUs allocable to be STAs, but the present invention is not limited to this. For example, the AP 102 may determine the number of RUs allocable to ax STAs and the number of RUs allocable to be STAs based on the number of ax STAs and the number of be STAs for which a radio link has been established. The AP 102 may also establish a radio link and then determine the number of RUs that are allocable to ax STAs and the number of RUs that are allocable to be STAs based on the number of each of ax STAs and be STAs that are requesting UL-MU communication. By determining the number of RUs that are allocable to ax STAs and the number of RUs that are allocable to be STAs in this way, the AP 102 can flexibly set the UL-MU communication in accordance with the state of wireless connection.

Returning to FIG. 6, the AP 102 determines the STA to be allocated an RU (step S602) and, if that STA is a be STA (YES in step S603), selects an RU to be allocated from among the RUs that are allocable to be STAs in the RU allocation list (step S604). Then, the AP 102 sets the selected RU to be non-allocable as in the process example 1. For example, a flag indicating whether or not it is to be allocated may be provided in the RU allocation list, and the AP 102 may set the flag corresponding to the selected RU to a value indicating that it is non-allocable. The AP 102 may also delete the selected RU from the RU allocation list. In addition, when the STA to be allocated an RU is an ax STA (NO in step S603), the AP 102 selects an RU to be allocated from among the RUs that are allocable to ax STAs in the RU allocation list and sets the selected RU to be non-allocable (step S605). The AP 102 repeats this processing until all the STAs that have already established a connection have been allocated an RU or until all available RUs have been allocated (step S606). If all the STAs that have already established a connection have been allocated an RU (YES in step S606), for example, the AP 102 ends the present processing.

In the process example 2 described above, if the number of RUs that are allocable to be STAs is smaller than the number of be STAs that have already established a connection with the AP 102, there may be some be STAs that are not allocated an RU. In such a case, the AP 102 may increase the number of RUs that are allocable to be STAs in the allocation of RUs to be executed in response to the next trigger frame. Similarly, if the number of RUs that are allocable to ax STAs is less than the number of ax STAs that have already established a connection, the AP 102 may increase the number of RUs that are allocable to ax STAs in the allocation of RUs to be executed in response to the next trigger frame. This makes it possible to prevent a situation in which only one of an ax STA and a be STA cannot be allocated an RU from occurring and ensure fairness in the allocation of RUs. When adjusting the number of RUs, it may be determined depending on the number of RUs to be increased or decreased whether to perform an adjustment using RUs whose corresponding subcarriers coincide between an ax RU and a be RU, such as the RUs 1 to 4 and the RUs 13 to 16 in the above example, or perform an adjustment using other RUs. That is, when increasing or decreasing one by one, RUs for ax and be may be switched in the RUs 1 to 4 or the RUs 13 to 16, and when increasing or decreasing by two or more, RUs for ax and be may be preferentially switched in the RUs 5 to 12. For example, if be RUs are to be increased by five from the state illustrated in FIG. 8, four RUs—the RUs 5 and 6 and the RUs 9 and 10—and one RU from the RUs 1 and 2 and the RUs 13 and 14 may be set as RUs that are allocable to be STAs. This can ensure flexibility in the allocation of RUs.

The AP 102 generates a trigger frame including information indicating the allocation of RUs determined by each above-described processing and transmits the trigger frame to the STA 103 and the STA 104. This makes it possible to, when the STA 103 and the STA 104 concurrently transmit a signal, instruct these STAs the use of frequency resources in which the signals of these STAs do not interfere with each other.

By the virtue of each above-described processing, it becomes possible to prevent the frequency resource allocated for the transmission of a signal by an STA of the IEEE 802.11ax standard from overlapping with the frequency resource allocated for the transmission of a signal by an STA of the IEEE 802.11be standard. Thus, it is possible for STAs respectively corresponding to these communication standards, to reduce how often communication failure occurs by avoiding concurrently transmitting a signal using overlapping frequency resources, and thereby it is possible to prevent frequency utilization efficiency from deteriorating due to communication failure.

In each above-described example of the processing, description has been given for a case where the frequency bandwidth to be used is 80 MHz, and 52-tone RUs are allocated to an ax STA and a be STA. However, the present invention is not limited to this. For example, when a frequency bandwidth that is 80 MHz or more or narrower is used or when 26-tone RUs or 106-tone RUs is allocated to an ax STA and a be STA, similar effects can be obtained by applying the above-described processing. Further, each above-described example of the processing may be applied to outside of allocation of RUs to ax STAs and be STAs. That is, the above-described method can be applied to a case where the unit of allocation of frequency resources (the allocation of subcarriers of an RU) is different between an arbitrary first wireless scheme and a second wireless scheme different from the first wireless scheme. By virtue of this, it becomes possible to, when allocating a frequency resource to a communication device of the first wireless scheme and a communication device of the second wireless scheme, suppress the occurrence of interference caused by a difference in the unit of allocation of frequency resources and thereby efficiently allocate the frequency resources.

Further, in the present embodiment, when there are no remaining RUs that are allocable to a be STA (an ax STA) and an RU cannot be allocated, for example, the AP 102 may prioritize that STA in the next opportunity for allocating RUs. That is, the AP 102 may preferentially allocate an RU to that STA in the allocation of RUs to be executed in response to the next trigger frame. In this instance, in step S502, the AP 102 may determine the STA to be allocated an RU based on the result of allocation in the previous trigger frame. This makes it possible to ensure fairness in the allocation of RUs to STAs that are connected to a wireless LAN.

The above-described method relates to a technique for allocating frequency resources between the IEEE 802.11ax standard and the IEEE 802.11be standard but may be applied to, for example, other standards of the IEEE 802.11 standard series. It may also be used, for example, for when allocating resources by cooperation between a cellular communication standard and the IEEE 802.11 standards. For example, the above-described technique may be applied when the communication of a cellular communication standard (e.g., Long Term Evolution or fifth-generation) is performed in the frequency band of a wireless LAN. In one example, after an RU of the IEEE 802.11ax standard or the IEEE 802.11be standard has been allocated, a resource block of a cellular communication standard some or all of whose frequency resources overlap with those of that RU may be made non-allocable. In addition, an RU of the IEEE 802.11ax standard or the IEEE 802.11be standard some or all of whose frequency resources overlap with those of the resource block allocated to a terminal device in a cellular communication standard may be made non-allocable. This makes it possible for the communication of a cellular communication standard and the communication of a wireless LAN standard to be concurrently performed without mutual interference. In addition, the above-described processing may be performed with another communication standard other than a cellular communication standard. When adjusting frequency resources with a standard other than a wireless LAN such as a cellular communication standard, the AP 102 can acquire information on resource allocation in the other communication standard and only allocate RUs of the wireless LAN.

The AP 102 may be configured to operate only in one of the IEEE 802.11ax standard and the IEEE 802.11be standard, for example. In one example, configuration may be taken so as to cooperate with another AP to obtain information on RUs to be allocated in the IEEE 802.11ax standard by that AP and determine an RU to be allocated to an STA of the IEEE 802.11be standard based on that information on RUs to be allocated. The above-described processing can be used when an AP cooperates with another AP to concurrently communicate with an STA operating in multiple versions of a surrounding wireless LAN communication standard.

Further, in the present embodiment, a configuration in which the AP 102 determines the allocation of RUs has been described, but a control device for controlling one or more APs 102 may be separately provided, and the control device may determine the allocation of RUs in the one or more APs 102.

In the embodiment described above, the process for transmitting an uplink signal to the STA 103 and the STA 104 has been described, but the same method can be applied to the allocation of RUs in downlink.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-093146, filed Jun. 2, 2021, which is hereby incorporated by reference herein in its entirety.

What is claimed is:

1. A communication device that supports first and second communication standards using an OFDMA (Orthogonal Frequency Division Multiple Access) technique, comprising:

at least one processor that executes a set of instructions, wherein the instructions, when executed, causes the communication device to perform operations comprising:
performing resource allocation processing for allocating, based on a frequency resource that has been allocated for communication of a first other communication device in accordance with the first communication standard that uses a first pattern for allocating a frequency resource, a frequency resource for communication of a second other communication device that conforms to the second communication standard that uses a second pattern for allocating a frequency resource,
wherein in the resource allocation processing, in a case where the first other communication device and the second other communication device concurrently communicate,
processing for specifying, from among frequency resources in the second pattern, a second frequency resource that partially or entirely overlaps with a first frequency resource that has been allocated to the first other communication device in accordance with the first pattern, and
allocation processing for allocating, from among frequency resources that are not included in the specified second frequency resource in the second pattern, a frequency resource to the second other communication device,
are performed.

2. The communication device according to claim 1, wherein in the resource allocation processing, second allocation processing for allocating the first frequency resource to the first other communication device in accordance with the first pattern is further performed.

3. The communication device according to claim 2, wherein in the allocation processing, processing for allocating, in accordance with the first pattern, a frequency resource to another communication device that operates in accordance with the first communication standard with priority over another communication device that operates in accordance with the second communication standard is performed.

4. The communication device according to claim 2, wherein in the resource allocation processing, processing for setting a frequency resource that can be allocated in the first pattern, and processing for setting, as a frequency resource that can be allocated in the second pattern, a frequency resource other than a frequency resource in the second pattern that partially or entirely overlaps with the frequency resource that can be allocated in the first pattern, are further performed,
in the second allocation processing, processing for allocating, to the first other communication device, a frequency resource that can be allocated in the first pattern is performed, and
in the allocation processing, processing for allocating, to the second other communication device, a frequency resource that can be allocated in the second pattern is performed.

5. The communication device according to claim 4, wherein in the resource allocation processing, processing for determining a number of frequency resources that can be allocated in the first pattern and a number of frequency resources that can be allocated in the second pattern based on a number of other communication devices that operate in accordance with the first communication standard and a number of other communication devices that operate in accordance with the second communication standard among other communication devices that have established a connection with the communication device is further performed.

6. The communication device according to claim 1, wherein the operations further comprising: generating, based on the first frequency resource that has been allocated to the first other communication device, a list indicating frequency resources that are allocable in the second pattern,
wherein, in the list, a frequency resource in the second pattern that partially or entirely overlaps with the first frequency resource is set to be non-allocable, and
in the allocation processing, a frequency resource is allocated to the second other communication device from among frequency resources that have not been set to be non-allocable in the list.

7. The communication device according to claim 1, wherein in the allocation processing, in a case where the first other communication device and the second other communication device concurrently transmit a signal, processing for specifying the second frequency resource that partially or entirely overlaps with the first frequency resource that has been allocated for the first other communication device to transmit a signal and for allocating a frequency resource for a transmission of a signal by the second other communication device from among frequency resources that are not included in the second frequency resource in the second pattern is performed.

8. The communication device according to claim 7, wherein in the allocation processing, processing for allocating a frequency resource with priority to another communication device whose amount of data to be transmitted is larger is performed.

9. The communication device according to claim 1, wherein the first communication standard is an IEEE 802.11ax standard and the second communication standard is an IEEE 802.11be standard.

10. The communication device according to claim 1, wherein the first communication standard is an IEEE 802.11be standard and the second communication standard is an IEEE 802.11ax standard.

11. A control method to be executed by a communication device, the method comprising:
performing resource allocation processing for allocating, based on a frequency resource that has been allocated for communication of a first other communication device in accordance with the first communication standard that uses a first pattern for allocating a frequency resource, a frequency resource for communication of a second other communication device that conforms to the second communication standard that uses a second pattern for allocating a frequency resource,
wherein in the resource allocation processing, in a case where the first other communication device and the second other communication device concurrently communicate,
processing for specifying, from among frequency resources in the second pattern, a second frequency resource that partially or entirely overlaps with a first frequency resource that has been allocated to the first other communication device in accordance with the first pattern, and
allocation processing for allocating, from among frequency resources that are not included in the specified second frequency resource in the second pattern, a frequency resource to the second other communication device, are performed, and wherein the first communication standard and the second communication standard are communication standards that use an OFDMA (Orthogonal Frequency Division Multiple Access) technique.

12. A non-transitory computer-readable storage medium that stores a program for causing a computer to execute a communication method, the communication method comprising:

performing resource allocation processing for allocating, based on a frequency resource that has been allocated for communication of a first other communication device in accordance with the first communication standard that uses a first pattern for allocating a frequency resource, a frequency resource for communication of a second other communication device that conforms to the second communication standard that uses a second pattern for allocating a frequency resource, wherein in the resource allocation processing, in a case where the first other communication device and the second other communication device concurrently communicate, processing for specifying, from among frequency resources in the second pattern, a second frequency resource that partially or entirely overlaps with a first frequency resource that has been allocated to the first other communication device in accordance with the first pattern, and allocation processing for allocating, from among frequency resources that are not included in the specified second frequency resource in the second pattern, a frequency resource to the second other communication device, are performed, and wherein the first communication standard and the second communication standard are communication standards that use an OFDMA (Orthogonal Frequency Division Multiple Access) technique.

* * * * *